United States Patent [19]

Planke

[11] 4,055,834

[45] Oct. 25, 1977

[54] METHOD AND A DEVICE FOR AUTOMATIC PATTERN RECOGNITION OF LIQUID CONTAINERS

[76] Inventor: Tore Planke, 3180 Nykirke, Norway

[21] Appl. No.: 690,466

[22] Filed: May 27, 1976

[30] Foreign Application Priority Data

June 3, 1975 Norway ................................ 751950

[51] Int. Cl.[2] ................................................ G06K 9/00

[52] U.S. Cl. .......................... 340/146.3 F; 250/223 B; 250/224; 340/146.3 H; 340/146.3 AC; 356/167; 356/240

[58] Field of Search .................. 340/146.3 H, 146.3 F, 340/146.3 AC, 146.3 MA; 250/223 B, 223 R, 224, 227, 236; 356/240, 167, 168, 158; 209/111.7

[56] References Cited

U.S. PATENT DOCUMENTS

| | | | |
|---|---|---|---|
| 3,224,322 | 12/1965 | Westbrook | 250/224 |
| 3,409,780 | 11/1968 | Fargo et al. | 356/167 |
| 3,521,074 | 7/1970 | Frobese | 250/236 |
| 3,529,169 | 9/1970 | Heaney et al. | 250/223 B |
| 3,549,890 | 12/1970 | Keller | 250/223 B |
| 3,566,135 | 2/1971 | Mouchart | 356/167 |
| 3,684,385 | 8/1972 | Einfalt et al. | 250/223 B |
| 3,840,857 | 10/1974 | Knight et al. | 340/146.3 MA |
| 3,942,001 | 3/1976 | O'Connor | 250/224 |
| 3,943,361 | 3/1976 | Miller | 250/236 |
| 3,955,179 | 5/1976 | Planke | 340/146.3 H |
| 3,987,301 | 10/1976 | O'Connor | 250/223 B |

*Primary Examiner*—Leo H. Boudreau

*Attorney, Agent, or Firm*—Nolte and Nolte

[57] ABSTRACT

Apparatus for identifying containers comprises a memory in which data relating to physical characteristics of containers is stored, a conveyor for transporting containers through a scanning station comprising a plurality of light detectors and a light source and signal generating means for generating signals distinguishing between those detectors obscured from said source by a container passing through said station and those not so obscured and means for comparing those signals with said data to identify the container. There is also disclosed a method of identifying containers utilizing such apparatus.

12 Claims, 17 Drawing Figures

METHOD AND A DEVICE FOR AUTOMATIC PATTERN RECOGNITION OF LIQUID CONTAINERS

The present invention relates to a method and a device for automatic pattern recognition of liquid containers, e.g. bottles, boxes or the like of varying size and shape, as indicated in the preamble of the attached claim.

From the Norwegian Pat. No. 126,900 it is known a device which by means of optical means automatically recognizes the pattern of empty bottles by means of detection of the shadow images of the bottles. The known prior art device makes use of a number of suitably disposed photo-detectors, for detection of the characteristic data about the bottles, e.g. the height of the bottles. When new bottle types are introduced into the market then possibly further photo-detectors are arranged in order to satisfactory detecting also these new bottles. If some bottle types disappear from the market, then the machine must be programmed not to give any refund for such bottles or the respective photo-detectors are removed. Upon installation of such a machine it will in most cases be necessary to provide an accurate test-run of the machines in order to ensure that the photo-detector unit is properly adjusted. In countries having a small number of refundable bottle types this will not represent any particular problem, but in any case it will be required that the service staff of the machine supplier carries out the work, which in turn necessitates a quite extensive service net, in particular if several machines have to be adjusted during a short period of time. Further this procedure is time consuming and therefore costly, in particular in countries or districts where new bottle types repeatedly are introduced into or disappear from the market, or where a large number of different bottle types are present. With the known device there are no means available for the return of bottles being non-refundable.

The present invention has an object to provide a simplified and automatic programming of the device according to the invention with regard to the refund value of the liquid containers and their characteristic data.

Another object of the invention is to provide programming and detection of the shape, colour, weight and get-up of the liquid containers.

A further object of the invention is to provide that objects which are not accepted by the device according to the invention, are returned to a receiving station.

These and other objects of the invention are solved as will appear from the description hereinafter with reference to the drawings. The characterizing features of the invention will appear from the attached claims.

Figure 6A:
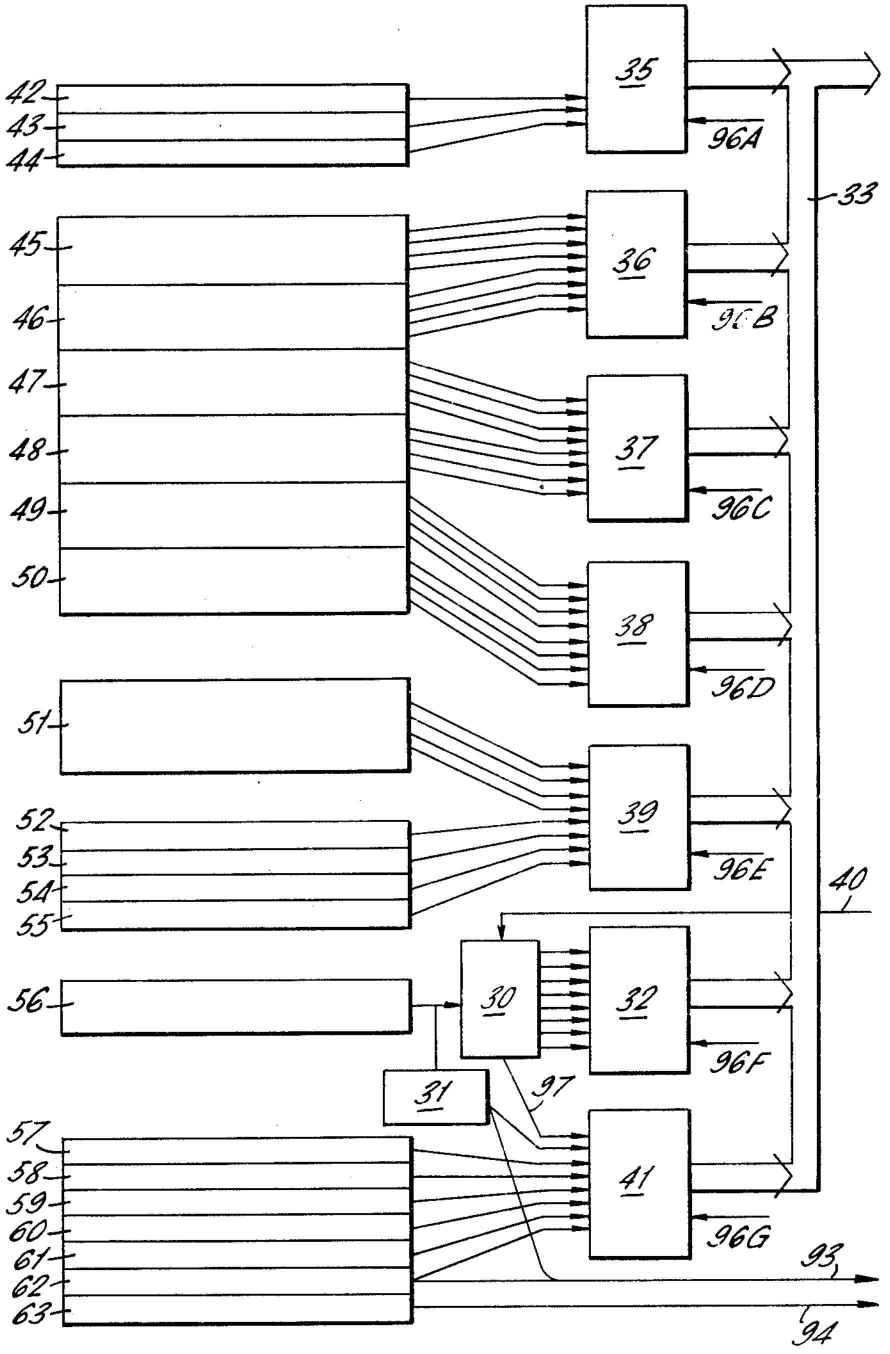
Figure 6B:
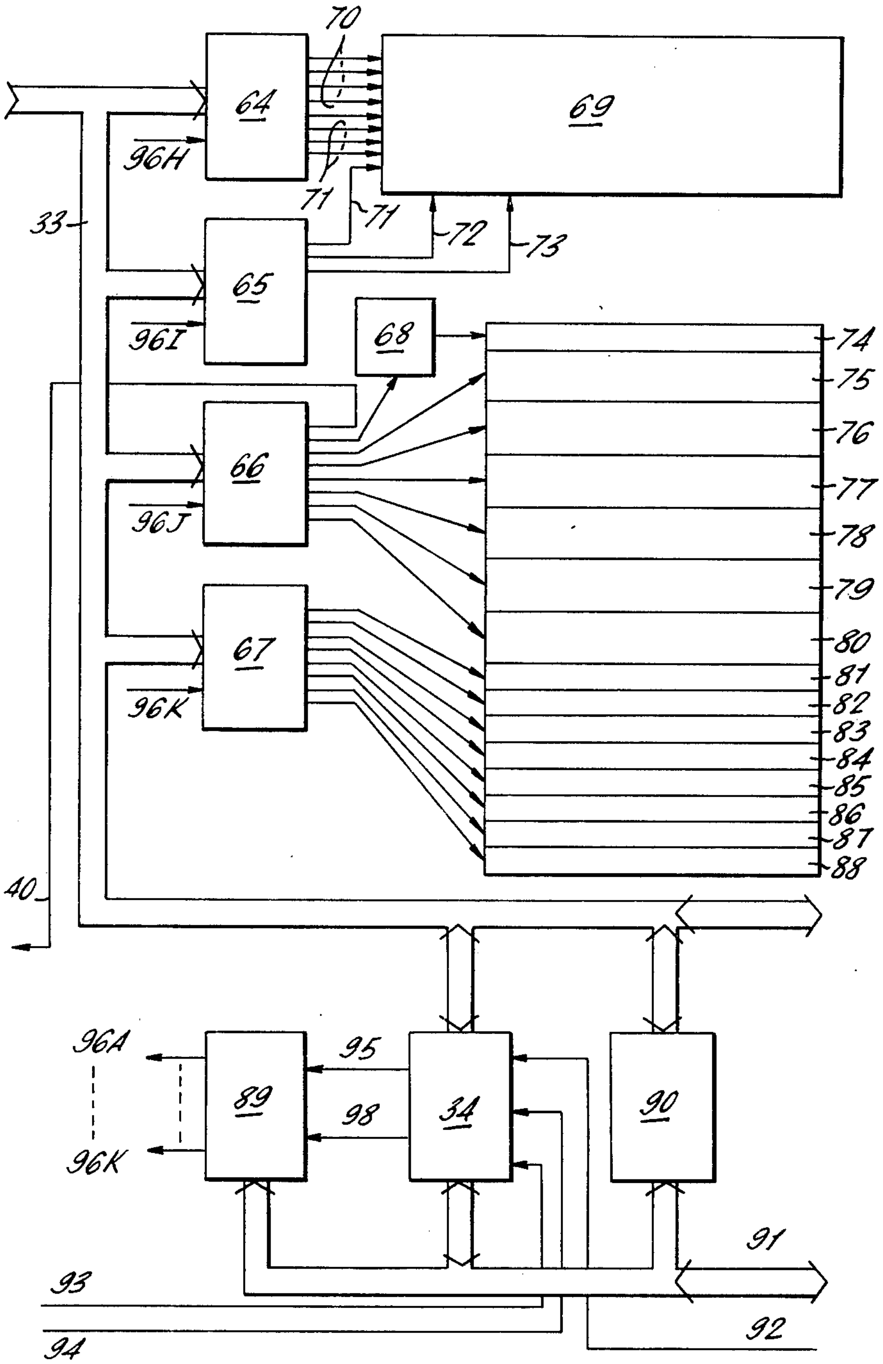

FIGS. 6*a* and 6*b* show together in a block diagram the electronic system of the device according to the invention.

Figure 7:
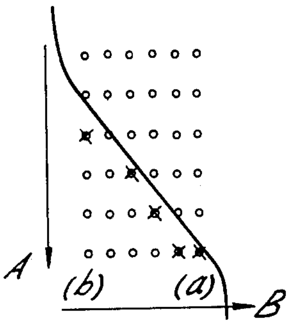

FIG. 7 illustrates the principle of detection of the particular shape of a liquid container.

Figure 8:
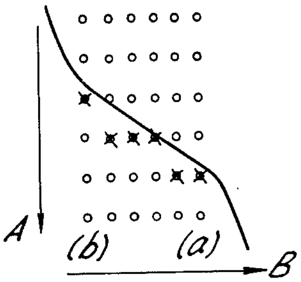

FIG. 8 is a further example of the detection method illustrated in FIG. 7.

Figure 9:
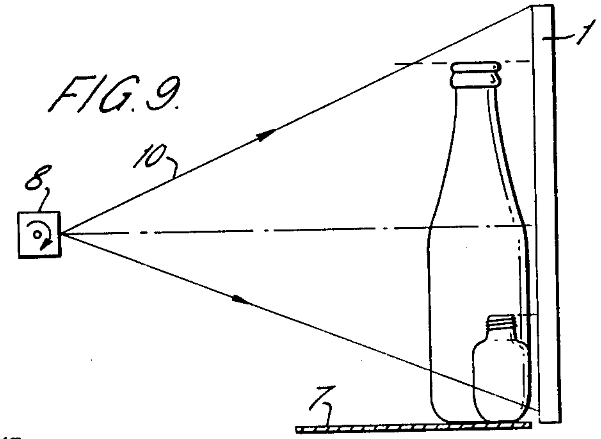

FIG. 9 illustrates the scanning angle and the upper and lower limit for detection of liquid containers.

Figure 10:
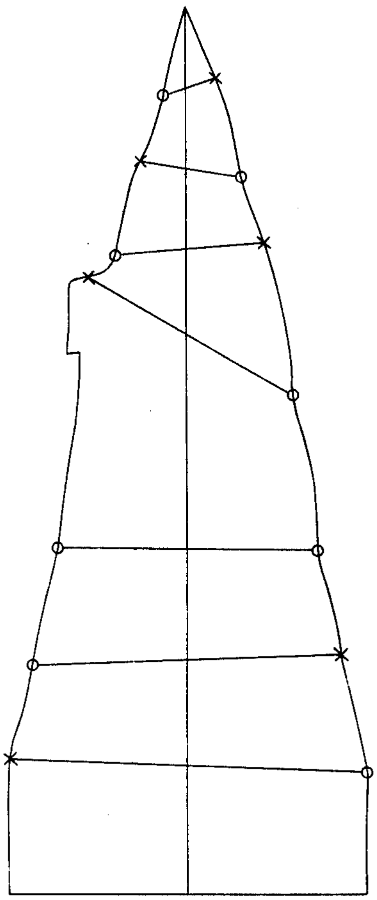
Figure 11:
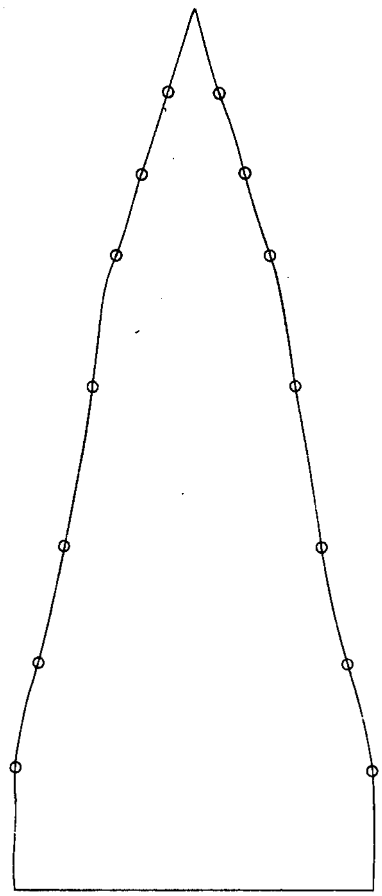

FIGS. 10 and 11 illustrate detection of liquid containers having an unsymmetrical shape or where the liquid container accidentally has been given an unsymmetric form.

Figure 12:
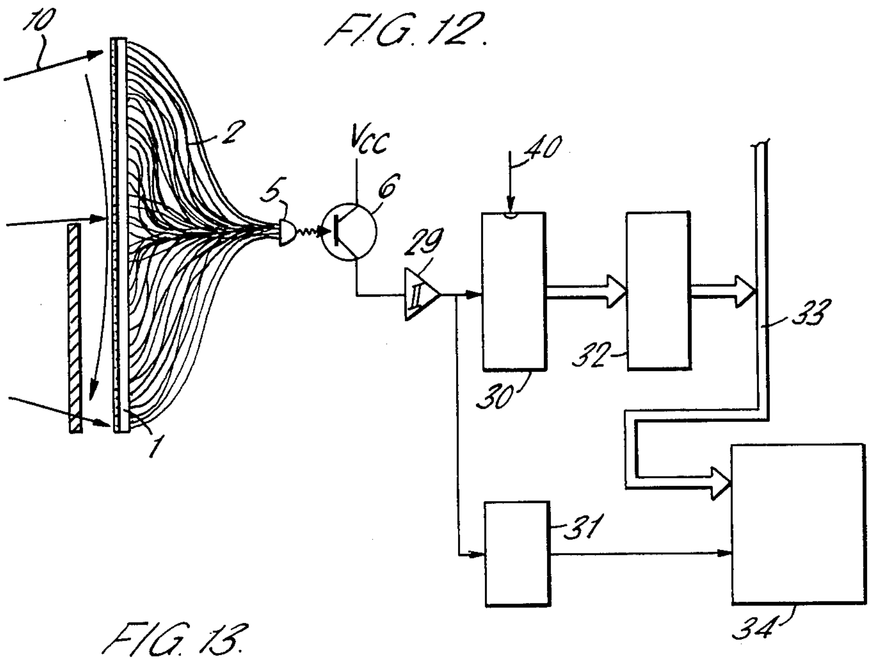

FIG. 12 shows a block diagram of the detection system according to the invention.

Figure 13:
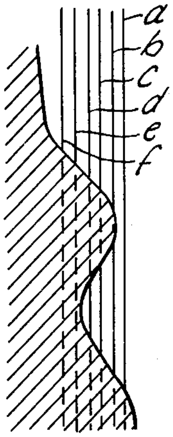
Figure 14:
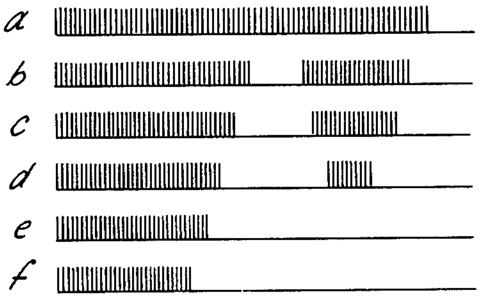

FIGS. 13 and 14 illustrate respectively sweeping and registration of narrow portions on a bottle and the pulse-trains being detected in this connection.

Figure 15:
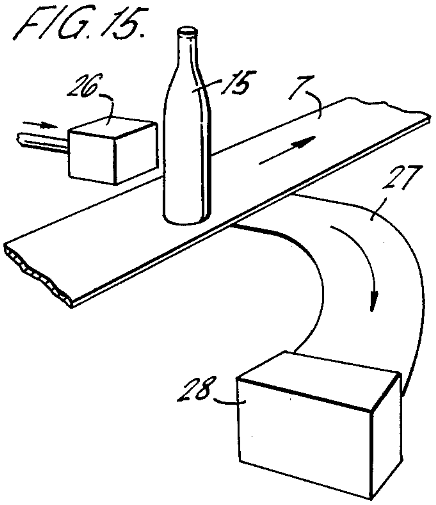

FIG. 15 illustrate means for return of non-refundable bottles.

Figure 16:
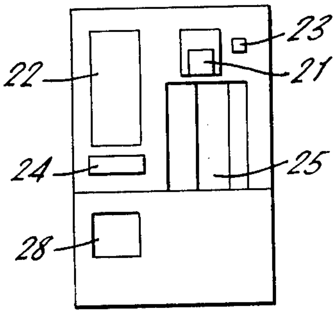

FIG. 16 shows an embodiment of a front panel of the device according to the invention.

In the following description the invention is disclosed in connection with detection, programming and registration of bottles. It will, however, be obvious to the expert that the invention also can be used for any kind of liquid container having a certain shape, colour, weight and get-up, and the invention is therefore not limited to the use with bottles, but may also be used with other objects.

Figure 1:
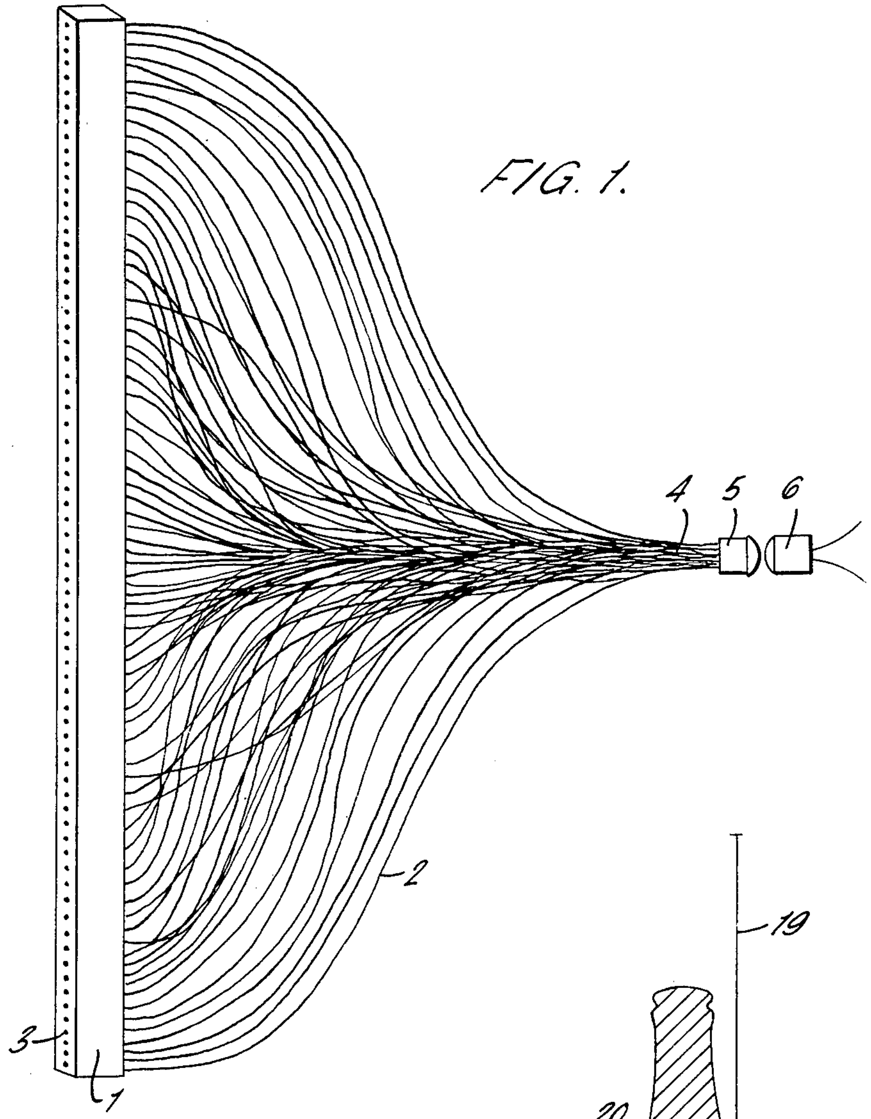
FIG. 1 shows a detector unit according to the invention.

In FIG. 1 a detector unit is shown consisting of a column wherein e.g. 256 ($256 = 2^8$) optical fibres 2 may be embedded, the ends 3 of said fibres being disposed along a column as shown in FIG. 1. The fibres may be embedded by means of an epoxy-resin into the column, and the ends 3 of the fibres should be made planar in order to achieve a satisfactory light absorption. At the other end 4 of the fibres all the fibres are collected into a bundle, and the light passing through said fibres is collected by means of a light-focusing device 5 in such manner that the light collected by the detector unit 1 can be registered by a photo-detector 6. The only active component in the combined unit of FIG. 1 is thus the single photo-detector 6, said feature also simplifying the electrical wiring as well as trouble-shooting in connection with a possible defective photo-detector. It will of course be possible to arrange two or several columns 1 and a corresponding number of photo detectors 6 if this for some reason is considered desirable. Further it will be possible for each detector unit 1 instead of one photo-detector to have e.g. two photo-detector by assembling fibre optics from the detector unit 1 into e.g. two bundles being connected to a respective photo-detector 6.

Figure 2:
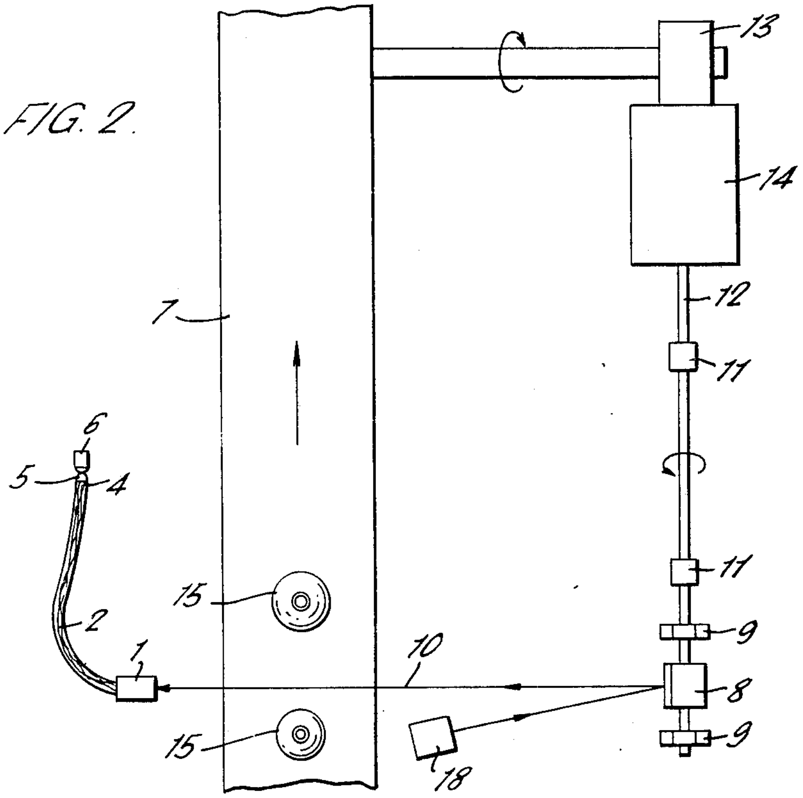
FIG. 2 illustrates schematically the means for operation of the detector unit according to FIG. 1.
Figure 3:
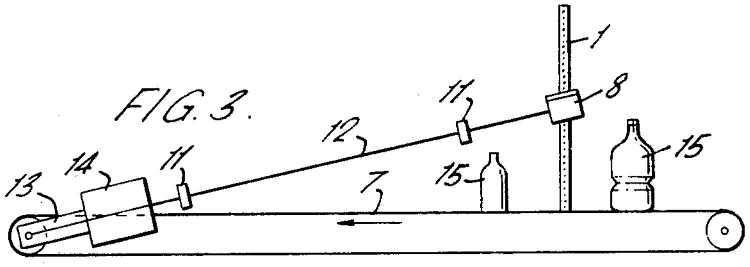
FIG. 3 shows in a side view a modification of the embodiment according to FIG. 2.
Figure 4:
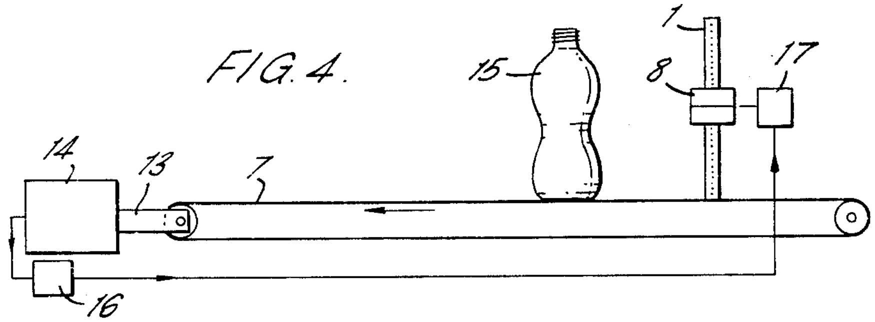
FIG. 4 shows in a side view a further modification of the embodiment according to FIG. 2.

The FIGS. 2, 3 and 4 illustrate schematically how a bottle is moving past a sweeping station. The sweeping station consists of a light source 18 in the form of a laser transmitter or an increment lamp which by means of lenses provides a narrow lightbeam having a small divergence, e.g. approximately 1 mm in diameter, and a rotating mirror 8 which causes the lightbeam 10 to move along a substantially vertical straight line in such a manner that the lightbeam impinges upon each of the light sensitive spots of the column 1, where the mutual distance between the spots or the fibre ends 3 preferably is equal.

A pulse is generated whenever the lightbeam impinges upon any of the spots. These pulse-signals are converted from light pulse-signals into electrical pulse-signals by means of the photo-detector 6 in such a manner that the output signal will be a pulse-train. In this manner a light-beam sweep will cause an output of pulses being equal to the number of light-sensors of column 1 provided that no bottles are shielding for the lightbeam.

The repetition rate of the light-beam sweep together with the speed of the conveyor 7 determine the horizontal resolution of the pattern recognition image (X direction).

The distance between the light sensitive spots of the column 1 determines the vertical resolution (Y direction).

In order to obtain a synonymous resolution in the X direction in the event of a varying coveyor speed, the rotation of the said mirror must be synchronized with the conveyor speed. This may be done in different manners as indicated in the FIGS. 2–4. The mirror 8 is supported in bearings 9 and is by means of a mechanical coupling 11 connected to an electro-motor 14 via an axle 12. The conveyor 7 is also powered by the motor 14 via a gear 13. As shown in FIGS. 2 and 3 the same motor can be used for operating both the mirror and the conveyor. In order to achieve a satisfactory resolution the rotational velocity of the mirror should be substantially higher than the velocity of the drive shaft for operating the conveyor 7. In FIG. 3 the mirror 8 is connected to the motor 14 by means of a rigid axle and a coupling 11. In FIG. 4 the connection between the mirror 8 and the electro motor is maintained by means of electrical wiring using a resolver unit 16, 17 or its technical equivalent. Bottles 15 are shown as examples of liquid containers which are to be detected by the sweeping light-beam.

The mirror 8 can comprise several mirror faces in such a manner that the unit incorporating these faces form in cross section a polygon, e.g. a square. Thus the mirror 8 in the case of a square will generate four light sweeps per revolution of the mirror unit.

Figure 5:
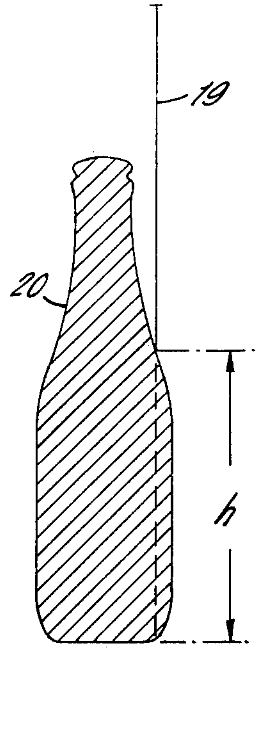
FIG. 5 shows schematically the detection principle according to the invention.

When the bottle enters the detection zone it will prevent the lightbeam from impinging upon all of the light sensors. By registering the various shadow spots as the bottle passes the detection zone, it will in this manner be possible to create a synonymous image of the contour of the liquid containers. As shown schematically in FIG. 5 it is created on the sweep detection column 1 a light sweep 19, the length *h* of which will be shadow on the column 1 due to the bottle 20.

In order to simplify the contour data of the liquid container, these data are processed in order to achieve a suitable format.

Preferably the calculated data of the liquid container may include the following structure: height, width, area of enclosed planar face, depth of restrictions, characteristic slanting angles, the number of small protrusions and incisions. All data will have to be indicated with different tolerances. The machine can thus be pre-programmed with said wanted data about the different bottles. The number of data and the bottles which can be programmed into the machine is substantially limited by the memory capacity and the processing rate of the sHBtem. As auxiliary means can be ued an electronic microprocessor with associated electronic circuits and memories.

For each new bottle being detected the above mentioned data will be calculated. These data are compared with the prior known data and upon coincidence the bottle is considered classified and will be registered as refundable.

As indicated above, the system is based on previously known data. These may be pre-programmed by means of ready-made data being e.g. available on tape. The system also includes an inherent offer for self-programming (auto-teaching). To fullfill this object programmes of the micro-processor may contain a particular programming routine permitting such self-programming. Said function may e.g. be activated by means of a key-switch.

The machine is now programmed by feeding through the device according to the invention a representative selection of the bottle type which is to pattern recognized as being refundable.

The contour read-off for the new bottle takes place as previously described, where data are now stored in the memory as new, instead of being the object of a comparison with previously known bottles. It is, however, assumed that a sufficiently large number of specimens of the new bottles are registered in order to obtain the actual tolerances of the bottle.

The refund value can be pre-programmed by means of a manually operable refund-programming panel, e.g. of the type of thumb wheel switches, matrix panel or key-board. Thereafter the machine is put into detection- and analysis state. The machine is now programmed to recognize the bottle is to accept and knows which refund value the respective bottle has.

When the customer shall obtain refund for his bottles, these bottles are fed by means of the conveyor through the machine past the optical scanning unit, the bottle is detected and pattern recognized. The refundable bottles are assigned individual refund values, said refund values being summed. By depressing a refund receipt button a receipt wll be given from the machine having the number of accepted bottles and the summed payable amount indicated thereon.

Several problems are linked to the registration of bottles, since both the height and the width of the bottles are varying to a large extent. This relationship is schematically illustrated in FIG. 9. In the said embodiment there has been indicated a light sweeping angle of approximately 50°. However, the invention is not limited to such a sweeping angle, since said angle will be dependent on the distance from the rotating mirror to the column 1. In connection with the pattern recognition it will be of some interest to calculate e.g. the minimum slanting angle or angles of the bottle-neck-contour being present. This may be carried out in a manner as indicated in FIGS. 7 and 8, where A indicates the light-sweep direction and B indicates the transporting direction of the bottle. The angle can e.g. be given by the difference between the first (a) and the last (b) height value within a certain number of sweeps, i.e. the angular indication in FIG. 7 has an angular value equal to 3 and in FIG. 8 an angular value equal to 2. The examples of FIGS. 7 and 8 show a number of sweeps equal to 6.

Further, attention must be given to protrusions and incisions on the bottle, restrictions and defects. A large number of bottles are provided with paper lables and metal tops. The latter may have a tendency to become loose from the bottle, or they are partly torn off. If this is the case, the machine must despite this fact be able to identify the bottle and this may be carried out as indicated in FIGS. 10 and 11. It is here made use of measurement only of the latest protruding points on the bottles, such that it is possible on the basis of the performed measurements to create an impression of the real look of the bottle (FIG. 11). In other words it has here been carried out a symmetry evaluation of the assumed profile of the bottle.

In order to be able to further identify the bottle it may be advantageous to measure its weight by means of a weight-interval scale device. Further it will be possible to measure the colour of the bottle, which may be colourless, brown, green or some other colour. With regard to tolerances, variations in colour must be taken into consideration.

As a suitable data structure one can e.g. use 16 words of each 8 bits, where the height of the bottle is described by 2 × 8 bits, the width by 2 × 8 bits, the area of the bottle by 2 × 8 bits, the depth of two restrictions on the bottle by 2 × 8 bits, where the respective smallest dimensions are defined by 8 bits and the respective largest dimensions are defined by 8 bits, such that the tolerance can be indicated in a suitable manner, angles are described by 6 × 4 bits, where the lowest values are indicated by 3 × 4 bits and the largest values by 3 × 4 bits, the number of protusions and incisions by 8 bits and the weight of the bottle by 2 × 4 bits with 4 bits on the minimum weight and 4 bits on the maximum weight, respectively. In addition a number of informations as e.g. colour can be indicated by 8 bits.

As a light source can be used e.g. a halogen lamp, the advantages of which are a long life, readily available, a large colour spectrum and a small power supply requirement. However such a lamp requires a somewhat expensive lens equipment in order to achieve a sharply concentrated light-beam.

As an alternative one can use a continuous laser, the advantage of which is a small divergence, but a laser has a limited life, there is a particular requirement for power supply and the equipment is expensive and not readily available and the laser only emits monochromatic light.

According to the invention it will be possible to use the lowermost portion of the infrared spectrum of incandescent lamps, eliminating problems linked to light passage through ordinary glass. This feature may be realized by using visible light during all mechanical adjustments, whereafter filters are inserted.

The detection system according to the invention is now to be described further with reference to FIG. 12.

Immediately prior to the light-beam 10 impinging on the uppermost fibre end 3 of the column 1 the counter 30 is re-set to the position 256 via the re-set input 40. For each fibre spot 3 being impinged by the light-beam there is generated a light flash to the photo-transistor 6, the output signal of which is an electrical pulse is amplified by means of a Schmitt trigger circuit 29. Each pulse reduces the contents of the counter 30 by one, i.e. a count-down is performed. This continues until the light-beam 10 is shielded or inhibited by a bottle. The absence detector 31 will now register the absence of pulses, and said detector generates an absence signal to the central processing unit CPU 34, which immediately reads off the contents in the counter 30 by means of the input gate 32 and the data bus 33. Corresponding procedure will be repeated for each sweep until the bottle has passed the detection zone.

The memory of the unit 34 will now contain a complete set of height measurements taken along a complete contour of the bottle. These incremental measurements will now form the basis for calculations of the most important characteristics of the bottle:

1. Maximum height equal to largest read-in value.
2. Maximum width equal to number of sweeps impinging upon the bottle.
3. The area is approximately proportonal to the sum of all read-in values.
4. Angles are measured as described with reference to FIGS. 7 and 8.
5. The depths of restrictions along the bottle are registered as described hereinafter with reference to FIGS. 13 and 14. The depths of restrictions are registered by counting the number of sweeps being detected in the restriction, where in the example shown in FIG. 13 the number of sweeps are three and labelled with the letters *b, c* and *d*. FIG. 14 indicates the measured pulse-trains in connection with the sweeps *a – f*.
6. Protrusions are registered when a certain number of sucessive height measurement have approximately the same value followed by a sudden change.
7. Incisions are registered as indicated at point (5) above, but where height and depth will be below a certain value.
8. Weight is registered as previously indicated in the present disclosure by using a pressure sensor having e.g. a digital output, said pressure sensor being positioned below the conveyor in a manner known per se. The weight value is read in directly to the unit 34 from the weight detector 51 via the input gate 39 and the data bus 33, FIG. 6.
9. In order to register colour one may use a technique known per se where the one photo-transistor 6 is assisted by colour detectors.

Having determined the characteristics of the bottle, these characteristics are compared with the previously known data available in the memory of the system.

If coincidence is present, the bottle is considered classified and is assigned a refund value according to its class. This refund value is added to the previously accumulated values.

If coincidence with the previously known data is not found, the bottle may by means of the pusher means 26, FIG. 15, be removed from the conveyor 7 and moved to a return path 27 and consequently to a receiving station 28.

In FIG. 16 there is shown an example of a front panel of the device according to the invention. The bottles are fed in through an opening 25 in the panel and when all the bottles have been fed in the customer or the operator depresses a receipt button 23 upon which action the printer 21 feeds out a receipt containing e.g. data about the number of registered bottles and the total refund value of the bottles. If e.g. a non-registrable bottle is returned, then an indicator 24 may by means of a light signal indicate that the bottle is not acceptable simultaneously with the bottle being returned to the receiving station 28. The space 22 may be suitable for instructions for operation or other information means.

The electronic unit of the device according to the invention is shown in block-diagram form in FIGS. 6*a* and 6*b*. There are two data buses in the electronic unit, the data bus 33 and the address bus 91, respectively.

The block 56 denotes the detector units as shown in FIG. 1 as well as the pre-amplifier 29. The outputs of the counter 30 are connected via input gate 32 and the data bus 33 to the central processing unit CPU 34. The counter 30 contains an overflow indicator which upon activation feeds an overflow signal to the CPU 34 via the line 97 and the input gate 41. The counter 30 is re-set by means of a re-set signal from the output gate 66 via the line 40. As described in connection with FIG. 12 the absence detector 31 is directly connected to the CPU 34. In addition to being connected directly to the CPU 34 via the line 93 the absence detector may also be connected via the input gate 41 and the data bus 33.

The data bus 33 is connected to both the CPU 34 and the memory 90, as shown n FIG. *6b.* In order to feed the data about new bottles, their refund value etc., data about possible malfunctionings, data about detected bottles and operation of certain control functions of the device according to the invention, use is made of a number of input gates 35, 36, 37, 38, 39, 32 and 41, which gates can be selectively activated by means of activating signal on their respective address lines 96A, 96B, 96C, 96D, 96E, 96F and 96G, said input gates all being connected to the data bus 33.

A detector 42 for detection of a bottle in the receiving or return station 28, a push-button 43 for the function "Print last refund sum", and a push-button 44 for initiating a test-operation may all be connected to the input gate 35.

The input gates 36, 37 and 38 are in the example shown connected to the outputs from the thumb-wheel switches 45 and 46, 47 and 48, 49 and 50, respectively. The switches 45 to 50 are used for programming of the refund value for the individual bottle types. It will, however, be possible to use a different refund programming panel, as indicated earlier in the disclosure.

In the example shown the input gate 39 is connected to the output of a weight detector 51, said detector preferably being of the step type having a digital output. Further the input gate 39 is connected to the outputs from a push-button 52 for initiation of the function "New bottle type", a push-button 53 for "Restart" of the device for some reason is not functioning, and a push-button 54 for a receipt from the printer 69. The push-button 54 and the printer 69 correspond respectively to the push-button 23 and the printer 21 in FIG. 16. Further a switch 55 for "Refund-value priority-giving" is connected to the input gate 39.

The functions linked to the input gate 32 have been described above.

The input gate 41 is in the example shown connected to a bottom detector 57 for the light sweep 10, a failure detector 58 for detection of e.g. malfunctioning of the detector unit, the printer etc., a light source failure detector 59, a paper end detector 60 for detection of lack of paper in the printer 69, a motor stop/overload detector 61, a mains voltage failure detector 62 and a detector 63 for detection of connected mains voltage, respectively. The detector 62 is preferably connected directly to the CPU 34 via the absence signal line 93 and the detector 63 is directly connected to the CPU via the zero-set line 94.

In order to control certain output functions, indicators etc. there has been arranged to the data bus 33 a number of output gates 64, 65, 66 and 67 which can be selectively activated by means of activating signals on the address lines 96H, 96I, 96J and 96K, respectively.

The output gates 64 and 65 are connected to the printer 69, where data about a numeral value are fed through the lines 70, data about digital number is fed through the lines 71, signal for paper feeding is fed through the line 72 and signal for activation of a paper cutter in the printer 69 is fed through the line 73.

The output gate 66 feeds a re-set signal to the counter 30 via the line 40. The abscence detector 68 which is connected to one of the outputs of the output gate 66 causes the lamp 74 for "Program OK" to be activated during the normal operation state. The output gate 66 will also control the refund register 75 which is a counter indicating the total registered refund value, the bottle register 76 which is a counter indicating the total number of registered bottles, an alarm bell 77 which is activated upon malfunctioning, a bottle return mechanism 78 as described in connection with FIG. 15, a conveyor motor 79 (corresponding to the motor 14 in FIGS. 2–4), and the light source 80 for sweeping the light-beam towards to detector unit (the light source 80 corresponding to the light source 18 of FIG. 2).

The outputs from the output gate 67 are connected respectively to a red lamp 81 and a green lamp 82 for creating light in the receipt button 54, the green lamp being operative as long as bottles are fed into the device, and the red lamp replacing the green lamp if the receipt button is operated in order to obtain a print-out about the wanted data about the registered bottles, to the lamp 83 for indicating that the detector column 1 has to be cleaned or dusted, since dust on one of the fibre ends may cause malfunctioning, to a lamp 84 for indicating that the conveyor 7 has to be washed, since dirt and spill from fed-in bottles after a certain time will cause the conveyor to become adherent, to lamps 85, 86 and 87 for overload, lack of paper in the printer and lamp failure, respectively, and to a lamp 88 for indication of a non-accepted bottle, which lamp 88 can be connected to the indicator 24 of FIG. 16.

The input gates 35, 36, 37, 38, 39, 32 and 41 and the output gates 64, 65, 66 and 67 can as previously mentioned be selectively activated via the address lines 69 A–K, where the activation signals are supplied via the address bus 91 to the detector 89 for input/output addresses, which decoder with regard to input/output addresses is controlled by the CPU 34 via the input line 95 and the output line 98. A request for data memory access can be activated via the line 92 to the CPU 34.

It will be readily understood by the expert that the embodiment of the electronic unit according to the invention as shown in FIGS. *6a* and *6b* only serves to illustrate the inventive ideal and its realization, and that alternative embodiments will be available within the scope of the invention. Thus the number of input and output gates may be increased or reduced, other functions than those linked with the input and output gates may be attached to the electronic unit and its circuit design may also be adapted to the actual requirement and the standard equipment, e.g. in the case of a microprocessor, which is selected and the "software" which is preferred.

I claim: .

1. A method for automatic recognition of containers of varying size and shape comprising storing data related to container sizes and shapes in a memory unit, transporting containers to be recognized along a transport path at a first speed, disposing a light receiving unit comprising a plurality of receivers on one side of said path, directing a narrow beam of light from the other side of said path to fall on said light receiving unit, causing said light beam to strike each receiver sequentially, repeating said process of causing said light beam sequentially to strike each receiver, cyclically at a rate directly related to said first speed, generating, in a form compatible with said data, signals distinguishing between those receivers obscured by a container passing said light receiving unit and those not so obscured and comparing said signals with said data to identify that container.

2. Method as claimed in claim 1 which comprises transmitting light received by aid receivers to a common signal generating means.

3. A method as claimed in claim 2 wherein said light is transmitted along optically conductive fibers.

4. A method as claimed in claim 1 in which said light beam is caused to strike each receiver sequentially by directing light from a source to a rotating reflecting unit.

5. A method as claimed in claim 1 wherein a laser beam is generated and is used as the light beam.

6. A device for automatic recognition of containers of varying size and shape comprising transport means for transporting containers along a transport path, a light receiving unit comprising a plurality of individual receivers disposed on one side of said path, means directing a narrow beam of light across said path to fall upon said light receiving units, light beam directing means for transversing said beam of light across said light receiving unit to strike each receiver sequentially, means causing said light beam directing means to be operated cyclically at a rate directly related to the speed of operation of said transport means, means generating signals distinguishing between those receivers obscured by a container passing along said transport path and in front of said light receiver unit and those no so obscured, a memory for storing data relating to containers and means for comparing signals generated by said means for generating signals with data stored in said memory.

7. A device as claimed in claim 6 wherein said light receivers each comprise an end portion of an optically conductive fiber.

8. Apparatus as claimed in claim 7 wherein ends of said optical fibers remote from said light receiving ends are disposed adjacent a common signal generating element.

9. A device as claimed in claim 7 wherein said light directing means comprises a rotating reflector unit.

10. A device as claimed in claim 9 wherein said reflector unit comprises an element having a polygonal cross section, at least one face of which is reflective.

11. A device as claimed in claim 6 comprising a connection between a drive mechanism of said transport means and said means causing said light directing means to be operated cyclically.

12. A device as claimed in claim 6 wherein a common drive means is provided for said transport means and for said means causing said light directing means to be operated cyclically.

* * * * *